United States Patent [19]

Pinnavaia et al.

[11] 4,367,163

[45] Jan. 4, 1983

[54] SILICA-CLAY COMPLEXES

[75] Inventors: Thomas J. Pinnavaia; Max M. Mortland, Tadashi Endo, all of East Lansing, Mich.

[73] Assignee: Research Corporation, New York, N.Y.

[21] Appl. No.: 254,213

[22] Filed: Apr. 15, 1981

[51] Int. Cl.³ .................. B01J 21/16; B01J 29/06
[52] U.S. Cl. ...................... 252/455 R; 252/455 Z
[58] Field of Search .................. 252/455 R, 455 Z

[56] References Cited

U.S. PATENT DOCUMENTS 4,216,188  8/1980  Shabria et al. ............... 423/118
4,235,751  11/1980 Del Pesco ..................... 252/450
4,238,364  12/1980 Shabtai ......................... 252/455 R
4,248,739  2/1981  Vaughn et al. ................ 252/455 R
4,271,043  6/1981  Vaughn et al. ................ 252/455 R

OTHER PUBLICATIONS

De La Cruz, et al. *Proceedings of International Clay Conference*, (Madrid, Spain) pp. 705–710 (1972).

*Primary Examiner*—Carl F. Dees
*Attorney, Agent, or Firm*—Oblon, Fisher, Spivak, McClelland & Maier

[57] ABSTRACT

A clay composition comprising silica intercalated between the interlayers of the clay.

28 Claims, 2 Drawing Figures

SILICA-CLAY COMPLEXES

BACKGROUND OF THE INVENTION

1. Field of the Invention

The present invention relates to intercalated clay compositions which have useful catalytic and adsorbent properties. More particularly, the invention relates to clay whose interlayers have been intercalated with silica.

2. Description of the Prior Art

Layered naturally occurring and synthetic smectites such as bentonite, montmorillonites and chlorites may be visualized as a "sandwich" composed of two outer layers of silicon tetrahedra and an inner layer of alumina octahedra. These "sandwiches" or platelets are stacked one upon the other to yield a clay particle. Normally this arrangement yields a repeating structure about every nine angstroms. A considerable amount of study has shown that these platelets can be separated further, by as much as 30 to 40 Å, i.e. interlayered by intercalation of various polar molecules such as water, ethylene glycol, and various amines. The interlayered clays thus far prepared from naturally occurring smectites, however, are not suitable for general adsorbent and catalytic applications because they tend to collapse when subjected to high temperature.

In the past, clay materials have been intercalated with a variety of materials in order to form a supported open structure material which is useful as an adsorbent, a catalyst support, filtration medium or the like. However, it has been difficult to obtain a modified clay material which is stable at relatively high temperatures on the order of 250° C.-500° C. When a solvent swollen clay is heated to high temperature, the solvent is vaporized and collapse of the silicate sheets of the clay results as the solvent is removed from the interlamellar regions. This collapse significantly reduces the surface area of the clay because the internal surfaces are no longer available for adsorption. To solve this problem, a number of approaches have been taken to modify the clay by introducing supports or "columns" of material into the interlamellar regions of the clay to hold the silicate sheets of the clay apart. For instance, in the preparation of clay materials intended for use at relatively low to moderate temperatures, the clay layers have been separated with an organic material. For instance Schabtai et al, Proc. 6th Int. Congr. Catal., B5, 1-7 (1976) show a system in which smectite is interacted with di-or polycations derived from rigid, preferably cage-like amines, which acquire a single stable orientation in the interlayer space because of the steric requirements dictated by the configuration of their structure. A 1,4-diazabicyclo (2,2,2) octane-montmorillonite was found to posses significant molecular sieve properties and markedly higher catalytic activity for esterification of carboxylic acids in comparision to ordinary alkylammonium-exchanged montmorillonites. Seto et al U.S. Pat. No. 4,159,994 show the intercalation of kaolin materials with an ammonium salt of a carboxylic acid having more than two carbon atoms, the alkali metal salt of a carboxylic acid having more than two carbon atoms, a lower alkylene glycol or a quaternized ammonium radical.

Because of the failure of the organic material impregnated clays at high temperatures, approaches have been taken to improve the stability of intercalated clays at high temperatures by intercalating clay substrates with various metal compounds. Thus, Lahav et al, *Clays and Clay Minerals*, 26, 107-115 (1978) have demonstrated the intercalation of smectite with interlamellar structures derived from aluminum, iron and nickel hydroxides. Yamanaka et al, *Clay and Clay Minerals*, 27(2), 119-124 (1979) have shown the intercalation of Na-montmorillonite with zirconyl chloride which gives rise upon dehydroxylation to internal pillars of zirconium oxide. This system appears to give rise to a structure which is thermally stable at elevated temperatures. Yet another metal salt intercalated clay system has been shown by V. E. Berkheiser et al in *Clay and Clay Minerals*, 25, 105-112 (1977) where smectite is intercalated with 1,10 phenanthroline metal complexes. Traynor et al, *Clay and Clay Minerals*, 26, 318-326 (1978) have shown the intercalation of smectities with bipyridyl metal complexes. Still further Loeppert et al, *Clay and Clay Minerals*, 27(3), 201-208 (1979) have demonstrated the intercalation of aqueous dispersions of $Na^+$-smectite or n-butylammonium-vermiculite with sulfate salts of Fe (II), Co(II) or Ni(II) bipyridyl or 1,10-phenanthroline complexes, whereby intercalated phases with spacings of about 29.5 Å are obtained. Still another disclosure of the stabilization of clay materials in U.S. Pat. No. 4,176,090, wherein the porous interlayer structure of a clay is stabilized with "pillars" of stable inorganic polymers of oxides of metals such as aluminum, zirconium and/or titanium. The oxide pillars are formed by hydrolysis of salts of the metals which have been impregnated into the open structure of the clay at the appropriate pH. While the prior art shows examples of clay intercalated with metal oxide structures which impart significant high temperature stability to the clay, nevertheless the prior art does not disclose clay substrates intercalated with silica which is a substance expecially well known for its high temperature stability characteristics. In this regard De Le Cruz et al, *Proceedings of the International Clay Conference*, 1972 (Madrid, Spain, June 23-30), pp. 705-710 have shown modified montmorillonite and vermiculite substrates which have been treated with trimethylchlorosilane or dimethyldichlorosilane, with the indication given that the organochlorosilanes react with interstitial water in the clay substrate treated to form silanol groups therein. However, hydrolysis of these organosilane reactants does not result in the formation of silica or hydrated silica structures in the clay. Moreover, it has been postulated that if the organosilanol impregnated clay is heated, the silanol compounds would react to form low molecular weight siloxane compounds which are not attached to the interlayer framework of the clay and could be eliminated from the clay substrate. A need therefore continues to exist for clay intercalated with silica structures.

SUMMARY OF THE INVENTION

Accordingly, one object of the present invention is to provide clay of improved stability characteristics at high temperatures.

Another object of the present invention is to provide open, porous clay materials which are useful as catalyst supports, adsorbents and filtering bed media.

Still another object of the invention is to provide porous expanded clay materials having intercalated structures between the interlayers of the clay.

Yet another object of the present invention is to provide an improved molecular sieve cracking catalyst.

Briefly, these objects and other objects of the present invention as hereinafter will become more readily apparent can be attained by a modified clay composition comprising silica intercalated between the interlayers of the clay.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
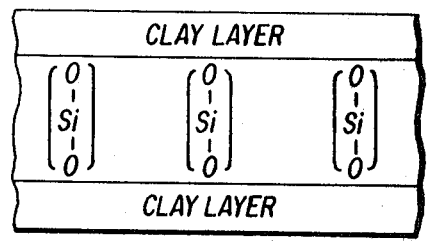
FIG. 1 is a representation of the structure of a silica intercalated clay of the present invention.

The outstanding feature of the present invention is that a clay based composition is provided in which the open, porous network of the clay is stabilized by intercalated silica structures between the interlayers of the clay. The term "intercalation" is a term of art which indicates the insertion of a material between the layers of a clay substrate. The article authored by Loeppert, Jr. et al, *Clays and Clay Minerals*, 27(3), 201–208 (1979) is an example of a reference which uses the term in the same way it is used in the present specification.

The clays which can be utilized as starting materials for the clay product of the invention are those which are swelling layer, lattice silicate clay minerals and their synthetic analogues which are capable of binding with at least one molecular layer of an ionic silicon complex or a silicon containing polymer. Suitable clays include the expandable smectites and vermiculite, as well as synthetic forms thereof such as reduced charge montmorillonite. Hofmann et al, *Z. Anorg. Allg. Chem.*, 212, 995–999 (1950) and G. W. Brindley et al, *Clays and Clay Minerals*, 19, 399–404 (1971) describe methods of preparing such synthetic clays.

Smectites are 2:1 clay minerals that carry a lattice charge and characteristically expand when solvated with water and alcohols, most notably ethylene glycol and glycerol, and are represented by the formula:

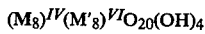

$$(M_8)^{IV}(M'_8)^{VI}O_{20}(OH)_4$$

wherein IV indicates an ion coordinated to four other ions, and VI indicates an ion coordinated to six other ions. M is commonly $Si^{4+}$, $Al^{3+}$ and/or $Fe^{3+}$, but also includes several other four coordinate ions such as $P^{5+}$, $B^{3+}$, $Ge^{4+}$, $Be^{2+}$, and the like. $M^1$ is commonly $Al^{3+}$ or $Mg^{2+}$, but also includes many possible hexacoordinate ions such as $Fe^{3+}$, $Fe^{2+}$, $Ni^{2+}$, $Co^{2+}$, $Li^+$, and the like. The charge deficiencies created by the various substitutions into these four and six coordinate cation positions are balanced by one or several cations located between the structural units. Water may also be occluded between these structural units, bonded either to the structure itself, or to the cations as a hydration shell. When dehydrated, the above structural units have a repeat distance of about 9 to 12 Å, as measured by X-ray diffraction. Commercially available smectites include montmorillonite, bentonite, beidellite, hectorite, saponite, sauconite and nontronite.

In the preparation of the silica intercalated clay of the present invention, a clay substrate is impregnated with a silicon containing reactant which will give rise to a supporting silica structure between the layers of the clay. When the clay is treated with the silicon containing reactant, the native metal ions which largely include alkali metal ions are replaced in the clay by silicon. Moreover, intercalation is conducted under conditions in which the clay substrate is swollen by an organic compound so that when the silica intercalated product is formed, the open structure of the clay is retained.

One general technique of preparing the intercalated clay product of the present invention involves the reaction of an ionic silicon complex at reactive sites within a swollen clay substrate and subsequent hydrolysis of the silicon complex to a hydrated silica structure. Suitable ionic silicon complexes include the likes of 1,3-β-diketone and α-hydroxy ketone complexes of silicon. Examples of 1,3-β-diketone complexes include silicon acetylacetonate [$Si(acac)_3^+$], silicon perfluoroacetylacetonate, and complexes derived from derivatives of acetylacetone such as 3-methyl pentan-2,4-dione and the like. Examples of α-hydroxyketone complexes include silicon tropilonates, and the like. When the ionic silicon complex impregnates the clay substrate, the native metal ions in the solvent swollen clay are displaced at the exchange sites in the clay, and upon hydrolysis, the silicon complex is destroyed leaving domains of bonded silica or at least partially hydrated silica between the interlayers. The clay substrate can be swelled with a solvent compound capable of swelling the clay prior to silicon complex impregnation or at the time of silicon complex impregnation. Suitable solvents are polar compounds which not only swell the clay, but are also solvents in which the ionic silicon complex dissolves. These polar compounds include ketones such as acetone, methylethylketone and the like; methylene chloride; dimethylsulfoxide, dimethylformamide and hexamethylphosphoramide. In some instances the solvent can be an organic compound which reacts with a silicon compound to form the ionic silicon complex in situ within the interlayer network of the clay such as acetylacetone, derivatives thereof, tropolone and the like. The amount of solvent used is not critical and need only be sufficient to swell and impregnate the clay with the silicon complex. Moreover, the temperature at which the clay is impregnated with the ionic silicon complex is not critical because the ion exchange reaction which occurs is not temperature dependent. Normally, the temperature used is about room temperature, although temperatures ranging from the freezing point to the boiling point of the solvent chosen are satisfactory.

The clay substrate is impregnated with an amount of ionic silicon complex sufficient to give an intercalated silica structure. The amount of silica intercalated within the interlayers should not so much that the interlayer regions actually become plugged with silica, thereby significantly decreasing the available surface area of the clay. On the other hand, the amount of silica intercalated within the interlayers should be an amount at least sufficient to maintain the spacing of the expanded clay. In a preferred embodiment the amount of silica intercalated within the clay is about the CEC (Cation Exchange Capacity) of the clay.

The ionic silicon complex can be introduced into the clay substrate by any one of several methods In a preferred embodiment, a hydrolyzable ionic silicon complex such as $Si(acac)_3^+$ can be prepared as shown by Dhar et al, *J. Am. Chem. Soc.*, 81, 6372–6375 (1959) and Riley et al, *Inorg. Syn.*, 7, 30–33 (1963). The clay is then contacted with the silicon complex dissolved in a polar solvent which swells the clay and the clay is allowed to equilibrate with the solution until the desired extent of exchange of the native alkali metal ions of the clay with the silicon ion complex is complete. After equilibration, the clay is usually washed with the solvent and allowed to dry in air.

In another method of exchanging complex silicon ions with the native ions of the clay, a given clay substrate can be swelled with the organic material, such as acetylacetone alone or in admixture with another solvent which, with silicon, forms the ionic silicon complex, and then the solvated clay is contacted with a silicon containing compound such as a silicon halide, $SiX_4$, wherein X is fluorine, chlorine, bromine or iodine, optionally in a solution of a solvent in which it dissolves such as benzene. The ionic silicon complex such as $Si(acac)_3^+$ forms in situ within the open clay structure, and contact of the clay with the reactants is continued until the desired extent of exchange of the native metal ions has been achieved. The solvated clay can be contacted with $SiX_4$ either in the liquid state or with $SiX_4$ vapor. As in the above technique, the treated clay can subsequently be washed with solvent and allowed to dry in air. Contact of the clay with the ionic silicon complex is conducted under the temperature conditions mentioned above.

Subsequent to exchange of the native ions of the clay with the complex silicon ions, the desired intercalated silica structure is completed by hydrolyzing the intercalated complex silicon ions in water. The pH of hydrolysis is not a critical factor since hydrolysis can be conducted under acidic, neutral or basic conditions. The hydrolysis of the complex silicon ions results in a hydrated silica structure. The hydrolyzed clay normally is then heated in the presence of a suitable oxygen containing gas such as air to oxidize any remaining organic residue complexed to the silicon ions and to dry the same, thereby yielding the intercalated clay product of the invention. A temperature which is sufficient to fully oxidize all organic material normally ranges from 100° C. to 600° C., preferably 500°–550° C.

An intercalated silica structure can be introduced into clay by a technique which does not require an ionic organosilicon complex, but instead involves impregnation of the clay with a halogenated polysiloxane which has been impregnated into a clay substrate. The clay can be swollen with a solvent in the manner described above. In order to prepare the halogenated polysiloxane reactant, a silicon halide such as $SiCl_4$ is reacted with an oxygenated organic compound such as benzoic acid, benzaldehyde, or other aldehyde compound, which can also act as the swelling agent for the clay. This reaction can be most conveniently accomplished by reacting the oxygenated organic compound with the silicon halide in the interlayers of the swelling clay substrate under conditions analogous to those described above for the in situ reaction of acetylacetone and silicon tetrahalide. The reaction which occurs is as follows:

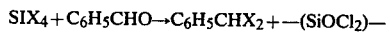

upon hydrolysis:

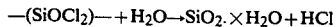

This technique has the attractive feature that in the formation of interlamellar siloxane bonds, both the products and the reactants are neutral species. Therefore, no charge redistribution is conducted in the interlayers of the clay mineral which indicates that the intercalated silica structures are not necessarily located at the cation exchange sites of the clay. It is believed that the halogenated polysiloxane material is retained between the interlayers by van der Waals interactions. After hydrolysis of the siloxanated clay, the clay can be washed and then dried over the temperature range indicated above prior to use for whatever purpose desired.

The intercalated clay product of the present invention is useful as an absorbent in a variety of applications, especially as particles in a Tyler mesh size range of 4 to 400, and can be used as a catalyst support for various catalytically active metals such as a Group VIII metal such as platinum, palladium, nickel, iron or cobalt; molybdenum; tungsten; a rare-earth and the like. Moreover, the intercalated product can be used in admixture with other common adsorbents or matrix materials such as silica, alumina, silica-alumina hydrogel and the like. The catalysts which can be prepared by supporting a catalytically active metal on the intercalated clay product of the present invention are especially useful in well known hydrocarbon conversion processes such as catalytic cracking, hydrocracking, hydrotreating, isomerization and reforming. The metals can be incorporated within the intermellar region of the expanded clay substrate as salts which exchange with metal ions in the clay. Upon reduction with some reducing agent such as hydrogen, the metal ions are reduced to the metal. An especially useful hydrocarbon conversion catalyst is that formed by supporting hydrogen ions, ammonium ions, an ion from Group IB to VIII of the periodic chart or mixture thereof on the intercalated clay product of the present invention. The intercalated clay product of the invention is also useful as a molecular sieve adsorbent.

The intercalated silica product of the present invention containing a catalytically active metal normally used in catalytic hydrogentation reactions such as platinum, nickel, palladium or the like can be used in a variety of hydrogenation reactions such as the hydrogenation of olefins, the hydrogenation of carbon monoxide to methanol and the hydrogenation of carbon monoxide to hydrocarbons, this latter reaction being known as the Fischer-Tropsch reaction.

As especially useful area of utility of the silica intercalated clay of the present invention is in the conversion of hydrocarbon feedstocks. In recent years, because of the depletion of worldwide petroleum feedstocks, attention has been directed to the development of alternate sources of liquid synthetic fuel and gaseous fuels from raw materials such as coal, oil shale and tar sands. Likewise, attention is also being directed to better utilization of native black oils and petroleum resids. The conversion of heavy petroleum liquids to distillate products such as gasoline normally requires catalytic processing, one of the most important of which being catalytic cracking. Molecular sieves have had an important and tremendous impact in petroleum refining in that the use of the same in various refining operations has improved conversion rates as well as product distribution. The catalytic action of molecular sieves is characterized by the following features:

(a) Organic substrates are "intrasorbed" in the sieve channel system, i.e. because of the constraining pore size and the "concave" geometry of the internal zeolitic surface. An incoming molecule is usually under the simultaneous action of an ensemble of surrounding catalytic sites. Consequently, substrate polarization is considerably stronger, that is, activation is easier, compared to that with conventional catalysts. Further, as a result of approximation and orientation effects operative in the channel systems, intrasorbed reactant molecules are in many cases favorably juxtaposed, with consequent decrease in the activation entropy of the reaction.

(b) Incorporation of catalytically active sites or chemically reactive species in the molecular sieve framework allows for the design and synthesis of a wide variety of specific adsorbents, catalysts and polymeric reagents.

(c) The specific geometry and dimensions of the channel system in a given molecular sieve catalyst allows for performance of molecular-shape selective processes.

Because of the unique characteristics of molecular sieves, they have been widely used in hydrocarbon conversion processes such as cracking, hydrocracking, isomerization, hydroisomerization, alkylation and dealkylation of simple aromatics. However, there are certain severe limitations with respect to the catalytic applications of molecular sieves. In particular, because of the narrow range of critical pore sizes found in such systems (approximately 3–10 Å) intrasorption and reaction of bulky or even medium-sized organic molecules is impossible. For instance, it has been demonstrated that most of the molecules present in raw coal liquids cannot penetrate into the intercrystalline pores of conventional zeolite catalysts. Furthermore, certain organic substrates, including monocyclic aromatic compounds have exhibited low intracrystalline diffusivity in zeolite media, resulting in poor recoveries and fast catalyst aging.

The silica intercalated clay of the present invention is especially useful in the types of catalytic applications discussed above with respect to the cracking of hydrocarbons because the open pore network of the clay has a pore size which exceeds 10 Å. It is expected that relatively large size organic molecules such as aromatic compounds will penetrate the pores of the clay where the desired conversion process will occur. Useful hydrocarbon conversion catalysts within the scope of the present invention are the silica intercalated clay functionalized with ions of hydrogen and the rare earth elements including cerium, lanthanum, samarium, neodymium, gadolinium, praseodymium, neodymium and the like.

Generally speaking, the intercalated clay product of the present invention has an interlayer spacing of 9.6 to 12.6 Å and a nitrogen BET surface area of about 40 to 300 m$^2$/g, preferably about 40 to 230 m$^2$/g.

Having generally described this invention, a further understanding can be obtained by reference to certain specific examples which are provided herein for purposes of illustration only and are not intended to be limiting unless otherwise specified.

Homoionic exchanged forms of montmorillonite from Upton, Wyoming (API Reference Clay No. 25), hectorite from Hector, California (supplied by Baroid Division of NL Industries) and vermiculite from Libby, Montana were prepared by equilibrating the <2−μm fraction of the minerals with aqueous solutions of the appropriate alkali metal ion or alkylammonium salts, washing the clays free of excess salt, and freeze drying. Thin, oriented film samples suitable for X-ray powder diffraction (XRD) or infrared (IR) absorption measurements were obtained by slow evaporation of aqueous suspension under ambient conditions. Reagent grade acetylacetone [H(acac)], benzaldehyde, and SiCl$_4$ were used without further purification.

EXAMPLE 1

The tris(acetylacetonato) silicon (IV) cation, Si(acac)$_3$$^+$ was prepared as the HCl$_2$(−) salt by the reaction of SiCl$_4$ with acetylacetone in benzene as described in Riley et al, *Inorg. Syn.* 7, 30–33 (1963). Ivory colored crystals of the compound were obtained from benzene over a 3–7 day period. The crystals were washed with diethyl ether, immediately dried in vacuo, and stored at room temperature under vacuum or under an inert atmosphere. The compound was found to decompose over the temperature range of 175°–180° C. (in a sealed capillary). Its IR spectrum in aetone and chloroform was identical to the spectrum reported by Thompson, *Inorg. Chem.*, 8, 2015–2018 (1969) for Si(acac)$_3$(HCl$_2$). The Si(acac)$_3$$^+$ cation was exchanged into freeze-dried or oriented-film samples of various swelling clays by dissolving in acetone a quantity of Si(acac)$_3$(HCl$_2$) corresponding to 2.0 or more times the CEC equivalent of the clay for two or more days. (The advantage in using an oriented-film sample of clay instead of a freeze-dried sample of clay is that since the platelets of the clay particles of the oriented film are oriented and not random as in the case of the freeze-dried clay samples, a clearer X-ray pattern of the 001 plane of the clay product can be obtained with oriented film samples.) The clay then was washed with acetone and air-dried. Hydrolysis of the surface bound Si(acac)$_3$$^+$ cation was carried out in water or in aqueous suspension at pH=9.0. Hydrolysis of the complex was verified by the appearance of acetylacetone with λmax=275 nm in the solution phase. Two to four days at room temperature were allowed for hydrolysis. The clays then were fired successively at 200°–240° C. for 10 hr. and at 500°–550° C. for 3–5 hr. in a muffle furnace to oxidize any remaining acetylacetone.

A Phillips X-ray diffractometer with Ni-filtered CuKα radiation was used to measure basal spacings. The basal spacings of the final products were in the range of 12.1 to 12.6 Å. Because the observed spacings are considerably larger than the 9.8–10.0 Å spacings expected for totally collapsed interlayers and because the carbon atom contents are uniformly low (0.6–1.3 wt.%), it is apparent that silica has been intercalated into the clay mineral.

The Si(acac)$_3$$^+$ exchange reaction was conducted on Ca$^{+2}$ and Al$^{+3}$ montmorillonite, Li$^+$-hectorite and Na$^+$ hectorite. The IR spectra of the exchanged clays as obtained with a Beckman Model IR-7 spectrometer show well defined bands at 1555, 1540, 1390, 1350 and 1320 cm$^{-1}$ that are characteristic of Si(acac)$_3$$^+$. The samples were examined as oriented thin films or were incorporated into KBr discs. In some cases a band attributable to the keto form of free acetylacetone also is observed near 1730 cm$^{-1}$ ($\nu$(C=O)), perhaps resulting from partial hydrolysis of Si(acac)$_3$$^+$ by small amounts of water. In each case a basal spacing of 16.7±0.3 Å is observed, suggesting that the Si(acac)$_3$$^+$ is intercalated.

Surface areas were determined by N$_2$ adsorption at liquid nitrogen temperature by employing a Perkin-Elmer Shell Model 212-B sorptometer. Samples were degassed by heating at 150°–160° C. under flowing He as a carrier gas. The adsorption data were plotted according to the BET equation. Table 1 below shows the basal spacings, carbon contents and $N_2$-BET surface areas for the silica intercalates.

Differential scanning calorimetry, conducted on a DuPont Thermal Analyzer which was operated in air at a heating rate of 10°/min from room temperature to 350° C., of the freshly hydrolyzed $Si(acac)_3^+$ clays showed two endotherms. One endothern at 100° C. may be assigned to the loss of water of hydration; the second endotherm at 310° C. may indicate the formation of siloxane bonds.

TABLE 1

| Initial Clay | d(001)(Å) | % C | Surface Area (m²/g) |
|---|---|---|---|
| Na⁺—Hectorite | 12.6 | — | 50² |
|  | 12.6 | 1.30 | 240 |
|  | 12.6 | 0.95 | 150 |
| Li⁺—Hectorite | 12.6 | 1.35 | 76 |
| Al³⁺—Montmorillonite | 12.6 | 0.61 | 180² |
|  | 12.1 | 1.41 | 100² |

¹Basal spacings, carbon contents, and $N_2$—BET surface areas were determined after hydrolysis in water or at pH = 9 and subsequent heating in air at 200°–240° and 500°–550° C.
²These samples were hydrolyzed in water; all other samples were hydrolyzed at pH = 9.

EXAMPLE 2

Several swelling clays containing non-complexing ions ($Li^+$, $Na^+$, $Ca^{2+}$) and complexing ions ($Cu^{2+}$, $Al^{3+}$) were solvated with H(acac), allowed to react with $SiCl_4$ in benzene, dried in oxygen, heated in air at 200° C. for 10–18 hr. to oxidize the organic fraction, and then heated at 500° C. for 3–5 hr. in air. A similar series of experiments was conducted with homoionic montmorillonites containing the alkylammonium ions $(CH_3)_4N^+$, $(CH_3)_3NH^+$, and $H_2(DABCO)^{2+}$, where the latter species is the diprotonated cation of 1,4-diazabicyclo[2.2.2]octane. The alkylammonium clays were solvated with H(acac) and allowed to react with $SiCl_4$ in a manner analogous to the inorganic exchange forms, except that the hydrolysis was carried out in water for 21 days prior to heating in air at 500° C.

IR adsorption spectra indicate that all of the swelling clays adsorb free acetylacetone. In addition, the clays containing complexing cations ($Cu^{2+}$, $Al^{3+}$) exhibit the presence of coordinated acetylacetonate in accord with the work of Parfitt and Mortland, *Soil Sci Soc Amer Proc*, 32, 355–363 (1968). Upon reaction with $SiCl_4$, all of the H(acac) solvated clays show the presence of surface bound $Si(acac)_3^+$ in their IR spectra.

Table 2 below lists the d(001) values of the products obtained after solvation with H(acac), subsequent reaction with $SiCl_4$, and heating in air at 500° C. Included in the table are surface areas of selected products obtained after heating at 500° C. In most cases the (001) spacing is near 12.6 Å, indicating the presence of an intercalated monolayer of siloxane chains. Spacings corresponding to collapsed or nearly collapsed interlayers are observed for the products obtained from $Cu^{2+}$- and $Li^+$- smectites. It is possible that in these cases the initial clay is not sufficiently swollen by H(acac) to allow penetration of $SiCl_4$, and consequently the $Si(acac)_3^3$ observed by IR is present only at external surfaces.

TABLE 2

| Initial Clay | d(001) (Å) After solvation with H(acac) | After reaction with $SiCl_4$ | After heating to 500° C. | Surface area (m²/g) |
|---|---|---|---|---|
| Al³⁺—Montmorillonite | 15.8 | 14.5 | 12.6 | — |
| Cu²⁺—Montmorillonite | 13.0 | 12.8 | 10.0 | — |
| Ca²⁺—Montmorillonite | 15.2 | 14.7 | 12.6 | — |
| Li⁺—Montmorillonite | 13.2 | 13.4 | 9.6 | — |
| Ca²⁺—Hectorite | 15.2 | 14.7 | 12.6 | — |
| Na⁺—Hectorite | 14.7 | 14.4 | 12.6 | — |
| Li⁺—Vermiculite | 15.2 | 14.5 | 12.6 | — |
| H₂(DABCO)²⁺—Montmorillonite | — | — | 11.0 | 42 |
| (CH₃)₃NH⁺—Montmorillonite | — | — | 11.8 | 91 |
| (CH₃)₄N⁺—Montmorillonite | — | — | 12.6¹ | 174 |

¹The carbon content of this product was 3.48 wt. %.

EXAMPLE 3

The metal exchanged clay samples shown in Table 3 below were treated with benzaldehyde, thereby giving benzaldehyde impregnated clay samples. The samples were then treated with a solution of $SiCl_4$ in benzene thereby resulting in the formation of $(SiOCl_2)_n$ within the interlayers of the swollen clay samples and subsequent reaction of the polysiloxane at the ion exchange sites within the clay samples. The reaction method was exactly analogous to that described above for the in situ reaction of H(acac) and $SiCl_4$.

Table 3 provides the (001) spacings for the three clays after different stages of reaction along with the surface area of one of the products. The successful intercalation of a siloxane monolayer is again indicated by the 12.6 Å spacings and the relative high surface area after heating to 500° C.

TABLE 3

| Initial Clay | d(001)(Å) After solvation with C₅H₅CHO | After reaction with $SiCl_4$ | After heating to 500° C. | Surface area (m²/g) |
|---|---|---|---|---|
| Na⁺—Hectorite | 14.7 | 14.3 | 12.6 | 190 |
| Li⁺—Vermiculite | 14.5 | 14.3 | 12.6 | — |
| Al³⁺—Montmorillonite | 14.5 | 14.2 | 12.8 | — |

The results above show that the hydrolysis of intercalated complex silicon ions such as $Si(acac)_3^+$ is effective for producing silica or at least partially hydrated silica structure in the interlayer region of swelling clays.

EXAMPLE 4

The hectorite used in this example was supplied in spray-dried form by Baroid Division of NL Industries. The sodium form of the mineral as an oriented film or in powder form was solvated with acetone and was then treated with $[Si(acac)_3][HCl_2]$ dissolved in the minimum amount of acetone. The ratio of $Si(acac)_3^+$ to CEC equivalents of the clay was 5:1. After a two-week equilibration time at room temperature, the clay was washed with acetone and air dried. It was then heated in air at 500° C. for five hours. The resulting material had a 12.6 Å spacing and a specific surface of 220 m²/g, as measured by $N_2$ adsorption at liquid nitrogen temperatures. X-ray diffraction data were obtained with a Philips diffraction unit using CuKα radiation. Infrared spectra were obtained using a Beckman IR-7 spectrophotometer.

The outstanding feature of the infrared spectrum of the silica intercalated hectorite is the absorption bands near 800 cm$^{-1}$ and 1200 cm$^{-1}$ which can be attributed to intercalated silica. The single band at 800 cm$^{-1}$ is found in several forms of silica such as, for example, amorphous silica, cristobalite and tridymite. The shoulder at 1200 cm$^{-1}$ is also found in some types of silica compounds, many having a layer type of structure.

Figure 2:
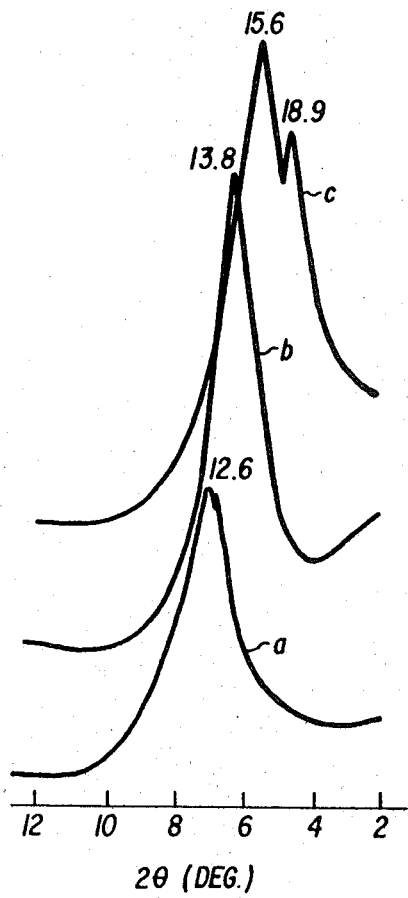
FIG. 2 is a series of 001 reflections of intercalated hectorite-silica structures under various hydrating conditions.

The 12.6 Å spacing for the hectorite-silica complex persists under dehydrating conditions, but hydration of the complex at high humidities and in liquid water yields higher interlamellar spacings. FIG. 2 shows the (001) reflections for the complex under various hydrating conditions indicating interstratified systems containing varying amounts of water within the interlamellar regions. Curve (a) is the pattern obtained after the hectorite-silica intercalate is heated at 500° C. Curve (b) is the pattern obtained after hydration of the intercalate at 95% relative humidity for 5 hours, while curve (c) is the pattern obtained after hydration of the intercalate in liquid water for 48 hours. When these systems were again dehydrated, the original 12.6 Å spacing was reestablished. The X-ray diffraction results indicate that while the hectorite-silica complex will swell, the silica is not expelled from the interlayers when the clay swells and contracts. Other polar molecules such as glycerol and pyridine also caused the hectorite-silica complex to swell. Spacings of 18 Å were obtained with glycerol. The 18 Å spacing is very near the value obtained for ordinary smectites possessing two layers of glycerol. Pyridine adsorption by the hectorite-silica complex results in a (001) spacing of 14.7 Å.

It has been found that different levels of silica intercalation may be obtained depending upon the reaction conditions. If the amount of intercalated silica is varied from clay sample to clay sample, it would be expected that the surface area and other properties of the intercalated clay samples would also vary. The determination of specific surface areas for the intercalate used in the present study gave a value of 220 m$^2$/g for nitrogen adsorption and 183 m$^2$/g for isobutane adsorption. These results indicate that the interlamellar areas are available to molecules as large as isobutane.

Since the cation exchange property of the smectite-silica intercalate is of interest, a sample of the intercalate was allowed to equilibrate in 0.4 N Cu(NO$_3$)$_2$ overnight. The clay was then washed exhaustively with water, dried, and a total analysis was made for Cu$^{2+}$ and Na$^+$. The results indicated 79.5 and 10.7 me/100 gm for Cu$^{2+}$ and Na$^+$, respectively, the sum of these values being close to the cation exchange capacity of the original material. Thus, the smectite had not lost much of its cation exchange capacity as a result of silica intercalation, and the exchange sites were not occluded by silica. The presence of Na$^+$ in the calcined product indicated that not all of the sodium ions were replaced in the exchange reaction with Si(acac)$_3$$^+$.

The Bronsted acidity of the smectite-silica complex was investigated by heating a film of the material to 400° C., cooling, and then exposing the cooled sample to NH$_3$ gas for several hours. An infrared spectrum of the product showed the development of the bands at 1435 and 3270 cm$^{-1}$ which can be attributed to the bending and the antisymmetric stretching modes of the NH$_4$$^+$ ion. The presence of NH$_4$$^+$ provides direct evidence for the presence of dissociable protons in the system. When the smectite-silica complex was allowed to react with liquid pyridine, an infrared band was observed near 1550 cm$^{-1}$, which is characteristic of pyridinium ion.

The source of the protons which are able to protonate the NH$_3$ and pyridine molecules is open to question. The hydroxyl groups present in pure hydroxylated silicas are not strong enough Bronsted acids to furnish protons for protonation of NH$_3$, while silica-alumina mixtures will form the ammonium ion. The Bronsted sites in the smectite-silica complexes are likely protons which are generated when the Si(acac)$_3$$^+$ hydrolyzes, and which neutralize the layer charge of the mineral.

Since the interlamellar surfaces of hectorite consist of oxygen atoms principally bridging silicon in tetrahedral positions and since the intercalated silica should be coordinately saturated, it would not be expected that there would be an appreciable concentration of Lewis acid sites in the interlayers of the silica-hectorite intercalation complex. Infrared studies of NO$_2$ can be helpful in probing the presence or absence of Lewis acid sites. It has previously been shown that dry alumina and silica-alumina absorb NO$_2$ exclusively by a dissociative mechanism that involves NO$^+$ and NO$_3$$^-$ formation. The NO$_3$$^-$ ion, which is strongly bound to vacant coordination positions on the surface, can readily be identified by strong infrared absorptions near 1600 and 1220 cm$^{-1}$. Thus it was of interest to examine the mode of NO$_2$ adsorption on the silica-hectorite complex.

A sample of silica intercalated hectorite was exposed to dry NO$_2$. Prior to exposure to NO$_2$ the sample was heated at 400° C. to remove water. An infrared spectrum of the sample showed the most intense band in the spectrum to occur at 1740 cm$^{-1}$. The 1740 cm$^{-1}$ band along with bands at 1260, 745 and 670 cm$^{-1}$ are near those observed for free N$_2$O$_4$ and are assigned to physically adsorbed N$_2$O$_4$ molecules. The bands at 1625 and 1308 cm$^{-1}$ are in the region expected for NO$_2$ molecules in equilibrium with N$_2$O$_4$ on the surface. No strong absorption bands occur in the region expected for coordinated NO$_3$$^-$. Thus no Lewis acidity is apparent in the interlamellar region. The band at 1673 cm$^{-1}$ cannot be assigned to physically adsorbed NO$_2$ or N$_2$O$_4$ or to NO$_3$$^-$ complexed to a Lewis acid site. A similar band has been observed in the past near 1658 cm$^{-1}$ for chemisorbed NO$_2$ on silica and it has been suggested that this band arises from the insertion of NO$_2$ into a strained Si-O-Si bond. A similar reaction may be occurring between NO$_2$ and intercalated silica.

The results of the present study, particularly Example 4, suggest that the silica incorporated in swelling clays is relatively inert. Its main function is to act as a prop to keep the silicate sheets apart. The clay interlayers can still be swelled by polar solvents after intercalation with silica and the silicate layers retain their cation exchange function as well. The silica is not expelled from the interlayers as the silica-smectite complex swells and contracts in successive adsorption/desorption cycles. The 12.6 Å spacing of the complex is sufficient to permit molecules as large as pyridine and isobutane to penetrate the interlamellar region. The presence of dissociable protons in the interlayer is indicated by the protonation of adsorbed NH$_3$ and pyridine. These acid sites probably arise as a result of protons formed in the hydrolysis of the Si(acac)$_3$$^+$ species used in the synthesis, and which subsequently neutralize charge arising from the smectite structure. The NO$_2$ adsorption studies indicate that adsorption occurs through a non-dissociation mechanism. No Lewis acidity is apparent in the interlamellar region, as expected based on structural considerations. The presence of Bronsted acidity without Lewis acidity is another indication that the silica intercalated clays of the present invention may have very desirable properties as catalysts.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A clay composition, comprising:
   silica intercalated between the interlayers of said clay.

2. The composition of claim 1, wherein said clay is an expandable, swelling layer, lattice silicate clay mineral or synthetic analogue thereof.

3. The composition of claim 2, wherein said clay is smectite, or vermiculite.

4. The composition of claim 3, wherein said smectite is montmorillonite, bentonite, hectorite, beidellite, saponite, nontronite, or sauconite.

5. The clay composition of claim 3, wherein said smectite has the formula: $(M_8)^{IV}(M'_4)^{VI}O_{20}(OH)_4$ wherein IV indicates an ion coordinated to four other ions; VI indicates an ion coordinated to six other ions; M is at least one of $Si^{+4}$, $Al^{+3}$, $Fe^{+3}$, $P^{+5}$, $B^{+3}$, $Ge^{+4}$, and $Be^{+2}$; and M' is at least one of $Al^{+3}$, $Mg^{+2}$, $Fe^{+3}$, $Fe^{+2}$, $Ni^{+2}$, $Co^{+2}$ and $Li^{+}$.

6. The composition of claim 1, wherein said silica is intercalated in said clay at the cation exchange sites within the interlayers of said clay.

7. The clay composition of claim 1, wherein the interlayer spacing of said intercalated clay ranges from about 9.6 to about 12.6 Å.

8. The clay composition of claim 1, wherein said intercalated clay has a nitrogen BET surface area of 40 to 300 m²/gr.

9. The composition of claim 1, which further comprises the silica intercalated clay of claim 1 functionalized with at least one Group VIII metal.

10. The composition of claim 1, which further comprises the silica intercalated clay of claim 1 functionalized with hydrogen ions, ions of at least one rare earth metal or mixtures thereof.

11. A method for preparing clay intercalated with silica, comprising:
    exchanging at least a portion of the native metal ions of a swelling clay with complex silicon ions; and
    hydrolyzing said complex silicon ions.

12. The method of claim 11, wherein said complex silicon ions are $Si(acetylacetonate)_3^+$ ions.

13. The method of claim 12, wherein said native metal ions are exchanged with $Si(acetylacetonate)_3^+$ ions by initially reacting $SiX_4$, wherein X is chlorine, bromine, iodine or fluorine, with acetylacetone, and then reacting the resulting $Si(acetylacetonate)_3^+$ complex with said swelling clay.

14. The method of claim 12, wherein said native metal ions are exchanged with $Si(acetylacetonate)_3^+$ ions by swelling said clay with acetylacetone, and then impregnating said swollen clay with $SiX_4$, wherein X is as defined above, thereby forming said $Si(acetylacetonate)_3^+$ ions in situ.

15. The method of claim 13 or 14, wherein the native ions of said clay are at least partially exchanged with said $Si(acetylacetonate)_3^+$ ions.

16. The method of claim 13 or 14, wherein said exchanged complex silicon ions are hydrolyzed by contact with water at a pH of about 9.0, and the hydrolyzed product is washed with a water soluble solvent and dried in air.

17. The method of claim 16, wherein residual organic material in said silica intercalated clay is removed and said clay is dried by heating said intercalated clay in the presence of an oxygen containing gas at a temperature of 100° to 600° C.

18. The method of claim 17 wherein said intercalated clay is heated to a temperature of 500° to 550° C.

19. A method for preparing clay intercalated with silica, comprising:
    reacting a polyhalosiloxane at the native metal ion sites of a swollen clay; and
    hydrolyzing said reacted polyhalosiloxane.

20. The method of claim 19, wherein said polyhalosiloxane is polychlorosiloxane.

21. The method of claim 20, wherein said polychlorosiloxane is reacted with said clay by swelling said clay with an oxygenated organic compound and then impregnating said swollen clay with $SiCl_4$, thereby forming said polychlorosiloxane in situ.

22. The method of claim 21, wherein said reacted polychlorosiloxane is hydrolyzed by contact of the clay with water, and then the hydrolyzed product is washed with a water soluble organic solvent and dried in air.

23. A hydrocarbon conversion catalyst comprising the silica intercalated clay product of claim 1 admixed with a crystalline aluminosilicate zeolite.

24. An adsorbent, comprising:
    the silica intercalated clay product of claim 1 ground into particles of a Tyler mesh size range of about 4 to 400.

25. A hydrocarbon conversion catalyst, comprising: the silica intercalated clay product of claim 1 functionalized with a Group VIII metal, W or Mo.

26. A hydrocarbon conversion catalyst, comprising:
    the silica intercalated clay of claim 5 functionalized with a cation selected from the group consisting of hydrogen, ammonium, Group IB to VIII of the Periodic Table and mixtures thereof.

27. A cracking catalyst comprising:
    the silica intercalated clay product of claim 1 functionalized with ions selected from the group consisting of hydrogen and the rare earth elements.

28. A hydrocarbon conversion catalyst comprising: the silica intercalated clay product of claim 1.

* * * * *